United States Patent
Wolf et al.

(10) Patent No.: US 12,436,078 B2
(45) Date of Patent: Oct. 7, 2025

(54) ASPIRATING SMOKE DETECTOR WITH TEST MODULE

(71) Applicant: Honeywell International Inc., Charlotte, NC (US)

(72) Inventors: Benjamin H. Wolf, Leicester (GB); Christopher Dearden, Melton Mowbray (GB); Michael Barson, Nuneaton (GB)

(73) Assignee: Honeywell International Inc., Charlotte, NC (US)

( * ) Notice: Subject to any disclaimer, the term of this patent is extended or adjusted under 35 U.S.C. 154(b) by 407 days.

(21) Appl. No.: 17/885,275

(22) Filed: Aug. 10, 2022

(65) Prior Publication Data
US 2024/0053243 A1    Feb. 15, 2024

(51) Int. Cl.
*G01N 15/06* (2024.01)
*G01N 1/24* (2006.01)
*G08B 17/103* (2006.01)

(52) U.S. Cl.
CPC .............. *G01N 15/06* (2013.01); *G01N 1/24* (2013.01); *G08B 17/103* (2013.01); *G01N 2001/245* (2013.01)

(58) Field of Classification Search
CPC .... G01N 15/06; G01N 1/24; G01N 2001/245; G08B 17/103; G08B 29/145; G08B 17/10
See application file for complete search history.

(56) References Cited

U.S. PATENT DOCUMENTS

| | | | | |
|---|---|---|---|---|
| 4,093,867 A | * | 6/1978 | Shah | G08B 29/145 356/438 |
| 5,670,946 A | * | 9/1997 | Ellwood | G08B 29/145 340/630 |
| 6,985,081 B2 | * | 1/2006 | Wagner | G08B 17/10 73/863.31 |
| 7,375,642 B2 | | 5/2008 | Siemens et al. | |
| 7,852,227 B2 | * | 12/2010 | Pepper | G08B 29/145 392/404 |
| 7,934,411 B2 | * | 5/2011 | Koch | G08B 29/145 73/1.06 |

(Continued)

FOREIGN PATENT DOCUMENTS

| | | |
|---|---|---|
| CN | 107452190 A | 12/2017 |
| EP | 4016490 | 6/2022 |
| KR | 102295285 | 8/2021 |

*Primary Examiner* — Freddie Kirkland, III
(74) *Attorney, Agent, or Firm* — Brooks, Cameron & Huebsch, PLLC

(57) ABSTRACT

Devices, systems, and methods for providing an aspirating smoke detector device with test module are described herein. One aspirating smoke detector particulate or gas generation module includes a housing having a test particulate or gas generation chamber formed therein and wherein the test particulate or gas generation chamber has an inlet connection to a first pipe of an aspirating smoke detector pipe network and an outlet connection to a second pipe of an aspirating smoke detector pipe network and a test particulate or gas release apparatus that introduces a predetermined amount of test particulate or gas into the test particulate or gas generation chamber so that after it travels through a portion of the aspirating smoke detector a measured amount can be determined.

20 Claims, 3 Drawing Sheets

(56) References Cited

U.S. PATENT DOCUMENTS

| | | | | |
|---|---|---|---|---|
| 8,121,465 | B2* | 2/2012 | Koch | G08B 29/145 |
| | | | | 261/142 |
| 8,434,343 | B2 | 5/2013 | Rossiter | |
| 8,966,952 | B2* | 3/2015 | Pepper | G08B 29/12 |
| | | | | 73/1.06 |
| 9,247,584 | B2* | 1/2016 | Fabian | G08B 29/145 |
| 9,659,485 | B2* | 5/2017 | Piccolo, III | G08B 29/145 |
| 10,302,522 | B2 | 5/2019 | Williamson | |
| 11,609,144 | B2* | 3/2023 | Moix Olive | G08B 29/145 |
| 11,756,400 | B2* | 9/2023 | Griffith | G08B 17/117 |
| | | | | 340/628 |
| 11,883,698 | B2* | 1/2024 | Remer | G08B 17/113 |
| 2004/0035179 | A1 | 2/2004 | Koch | |
| 2009/0308134 | A1* | 12/2009 | Pepper | G08B 29/12 |
| | | | | 73/1.06 |
| 2011/0041587 | A1* | 2/2011 | Rossiter | G08B 29/14 |
| | | | | 73/31.03 |
| 2014/0260512 | A1* | 9/2014 | Fabian | H05B 3/0038 |
| | | | | 73/1.06 |
| 2017/0045415 | A1 | 2/2017 | Williamson | |
| 2020/0047011 | A1 | 2/2020 | Remer | |
| 2021/0348982 | A1* | 11/2021 | Moix Olive | A62C 37/50 |
| 2022/0139185 | A1 | 5/2022 | Griffith | |
| 2023/0251117 | A1* | 8/2023 | Simeoni | G01F 15/061 |
| | | | | 73/861.18 |

* cited by examiner

ASPIRATING SMOKE DETECTOR WITH TEST MODULE

TECHNICAL FIELD

The present disclosure relates to devices, systems, and methods for providing a aspirating smoke detector with test module.

BACKGROUND

Fire alarm systems alert occupants of a building that there is a fire and that they should leave the building until emergency personnel can extinguish the fire and deem the building safe to return. One of the biggest causes in people 'losing faith' in the alarm being raised is when they have suffered from false alarms.

For example, in apartment complexes, the residents will all have to leave their apartments and muster outside the building. Also, at a manufacturing facility, production lines will need to be shut down while workers leave the building. Both such instances can be impactful on a person's life and negatively impact their faith in the alarm system.

In many instances, the local fire service may even fine the building owner when being incorrectly called out to an event. Accordingly, avoiding false alarms and restoring faith in the alarm system are key goals for any building owner.

Aspirating smoke detectors use a series of pipes running from a central monitoring device to pull air from locations within a building and test the air received at the central monitoring device to detect whether smoke or a gas is present in a particular location. For example, an aspirating smoke detector can have a number of pipes with one end of each pipe located in a different room or area within a building, and the other ends of the pipes connected to the central monitoring device that has a pump to draw air through the pipes and a number of sensors at the central monitoring device to sense whether smoke or a gas is present in the air drawn through the pipes.

The aspirating smoke detector has to monitor the airflow through the detection pipes and, therefore, airflow is important in aspirating smoke detector systems. Accordingly, such systems should do periodic maintenance to ensure that the system is operating normally and that airflow through the pipes is flowing normally.

DETAILED DESCRIPTION

Figure 1:
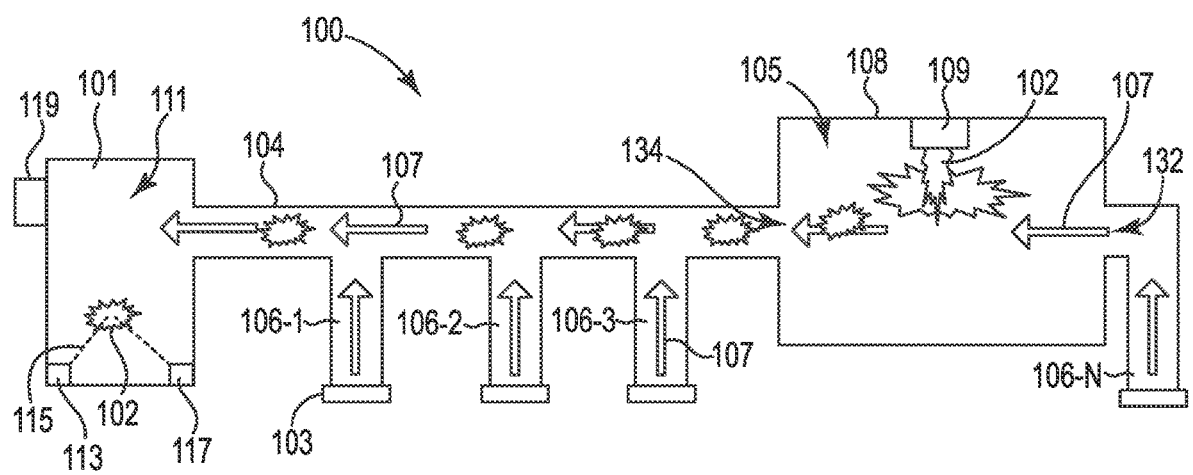
FIG. 1 is an example of an aspirating smoke detector system with test module in accordance with one or more embodiments of the present disclosure.

Presently, to accomplish testing of the system, a maintenance engineer needs to introduce a smoke source or synthetic smoke source into the aspirator pipe network manually to test functionality of the aspirating smoke detector. Unlike the embodiments of the present disclosure, these tests may not accurately confirm the response time for the smoke to move through the aspirating smoke detector pipe network or confirm the sensitivity of the system through using a controlled quantity of smoke. Additionally, the tests may not accurately determine the ability of the aspirating smoke detector to detect an actual fire. Further, creating test points at low level can be very demanding from an install perspective and uses significant additional material.

Devices, systems, and methods for providing an aspirating smoke detector device with test module are described herein that address the issues described above. For example, one aspirating smoke detector particulate or gas generation module includes a housing having a test particulate or gas generation chamber formed therein and wherein the test particulate or gas generation chamber has an inlet connection to a first pipe of an aspirating smoke detector pipe network and an outlet connection to a second pipe of an aspirating smoke detector pipe network and a test particulate or gas release apparatus that introduces self-test particulate into the test particulate or gas generation chamber. Such a module can be part of a test aspirating smoke detector system as discussed in more detail below.

In an aspirating smoke detector system an aspirating smoke detector device will draw the test particulate or gas through the aspirating smoke detector pipe network toward the aspirating smoke detector device that has a smoke detecting chamber therein, this test particulate or gas will become diluted as it mixes with clean air being drawn from aspirating smoke detector pipework sampling points (e.g., inlet holes at the end of a pipe that allow access of air into the pipe from an area within the building that is to be monitored) as it travels to the aspirating smoke detector device. When sufficient test particulate density arrives and is sensed within the smoke or gas detection chamber, in the aspirating smoke detector device, it will trigger a test fire alarm signal.

In some embodiments, an aspirating smoke detector system can also be connected to a control panel of a main fire alarm system of a building which may include non-aspirating smoke detector components. The fire alarm system control panel (e.g., one option for a self-test aspirating smoke detector system controller) can be used, for example, to initiate the test aspirating smoke detector particulate generation module which can introduce a controlled amount of self-test particulate (e.g., aerosol) or gas (e.g., carbon monoxide) into a space at or near the furthest end of the aspirating smoke detector pipe network. For instance, some embodiments provide for a testing module that can be placed at or near a furthest end of an aspirating smoke detector pipe network, which is, for example, connected to and supervised by a main fire alarm control system (see the embodiment shown in FIG. 2), as discussed above.

According to embodiments of the present disclosure, the aspirating smoke detector device can measure the density of test particulate or gas that has been detected in the smoke or gas detecting chamber, allowing analysis of the dilution of the test particulate or gas as it flows through aspirating smoke detector pipe network. This will allow the aspirating smoke detector device to analyze the performance of the aspirating smoke detector system for both aspirating smoke detector device filter performance (e.g., detecting potential blockages) as well as indicating if any sampling points may be blocked in the aspirating smoke detector pipe network, among other functions and benefits.

Current aspirating smoke detector implementations are able to determine whether a sampling point is fully blocked by measuring the reduction in airflow, however, they are not able to determine when a filter within the system (e.g., within the aspirating smoke detector device) is partially blocked and may require changing. Embodiments of the present disclosure can also determine a response time value from when the test particulate or gas was introduced in the aspirating smoke detector pipe network to when it is detected by sensors in the main aspirating smoke detector detection chamber.

This can, for example, be achieved in an automated process, (e.g., scheduled periodically or initiated remotely) without the need for a maintenance engineer to be on site. Results of the system test can be compared with an original system design calculation value and/or calibration value and highlight any divergence from its original performance characteristics in an automated analysis process wherein computer executable instructions are executed by a processor to compare the resultant value of the test with at least one of the calculation value or the calibration value to determine any divergence from those values and determine whether the divergence is beyond a threshold value that would indicate a blockage or that a filter cleaning or change is needed.

An original system design calculation can, for example, be determined based on at least one characteristic of the system, such as the volume of space within the pipes and other components of the system through which air will travel as it moves through the system and the rate at which the air moves through the system. From this calculated value, a threshold limit value can be calculated that indicates the air pathway through the pipe network has a blockage that will affect performance of the system (e.g., the density of the test particulate would be insufficient to trigger a fire alarm). This could be determined by the manufacturer through testing or calculated and set by a technician during the commissioning process for the system or another suitable time.

A calibration value can be a threshold value that is determined by actual testing of the system (e.g., determining the time from initiating generation of test particulate or gas to sensing of test particulate or gas in the smoke or gas detecting chamber), for example, during the commissioning process or other suitable time and recording the time value in memory. This calibration value can also be a threshold limit value that indicates the air pathway through the pipe network has a blockage that will affect performance of the system.

In some embodiments, results of any analysis of smoke or gas dilution, response time, and/or blockage detection can be relayed via a remote gateway, for example, to a technician's mobile device or to a remote fire system monitoring facility where it can be reviewed by fire system monitoring personnel. This can be done to, for example, flag or alert any issues with the aspirating smoke detector system to a maintenance provider.

Some of the benefits of the embodiments of the present disclosure include a simple installation, as a technician can simply take a self-test module (containing self-test material used to generate self-test particulate or gas and a mechanism to initiate the generation of the particulate) from an existing self-test fire detector system loop to serve the aspirating smoke or gas detector unit or have a self-test powered unit placed at height to be controlled remotely. This can save significant time and/or cost.

Another benefit is that the embodiments of the present disclosure provide simpler testing. For example, a remote application on a mobile device used by a technician can be used to generate the whole self-testing process without the need for manually use of test points and smoke cans.

Embodiments of the present disclosure can provide more accurate testing. For example, the processes disclosed in the embodiments of the present disclosure can pinpoint where any issues are within the aspirating smoke detector pipe network. This is because blockage values can be calculated or tested during calibration to determine different threshold values for blockages in different areas of the pipe network. This means that blockage detection and corrective action can be accomplished more quickly resulting in less system downtime and/or technician time spent.

In some embodiments, self-test systems are configured to initiate a smoke detection test from a remote device. Test systems include a test particulate or gas release apparatus that generates particulate similar to smoke particles or gas from an actual emergency event and uses the generated test particulate or gas to perform a test of the aspirated smoke detector device. Test device equipped systems can reduce the time it takes to test a fire system and reduce the workforce needed to test the system.

As discussed herein, aspirating smoke detector devices can be ineffective if their pipe network becomes blocked in such a manner that the air flow through the network falls below a threshold level. Accordingly, the embodiments of the present disclosure allow for mitigation of blockage issues, thereby improving the ability for the smoke alarm system to perform reliably.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. The use of the term "N" after an element number (e.g., 106-N) intends that there can be any non-zero integer number of items 106.

FIG. 1 is an example of a self-test aspirating smoke detector system with test module in accordance with one or more embodiments of the present disclosure. As illustrated in FIG. 1, the system 100 includes an aspirating smoke detector device 101 that has a smoke or gas detecting chamber 111 wherein a sensor 113 (e.g., a light source projects a light beam 115 through the chamber 111 and a receiver 117 receives a portion of the light from the light beam that is scattered within the chamber by the smoke, gas, or test particulate 102) detects whether smoke/test particulate 102 or gas is present within the smoke or gas detecting chamber. Any suitable type of sensor can be utilized to detect the particulate or the presence of a gas.

The system 100 also includes a main pipe 104 that receives air (and, within the air, potentially smoke particles, a gas, and/or test particles 102) from a number of ancillary pipes 106-1, 106-2, 106-3, 106-N that draw air from different spaces within the building that are being monitored by the aspirating smoke detector system 100. For example, 106-1 may draw air from a first room in the building, 106-2 may draw air from a second room in the building, 106-3 may draw air from a first area within a third large room in the building (e.g., a warehouse area), while 106-N may draw air from a second area within the third large room in the building. These pipes 106 each have an inlet in a sampling point 103 through which the air passes from the room being monitored into the pipe 106.

The aspirating smoke detector system 100 also includes a test aspirating smoke or gas detector particulate generation module 108. The test aspirating smoke detector particulate or gas generation module 108 has a housing that includes a test particulate or gas generation chamber 105 in which test particulate 102 is generated. The test particulate or gas generation chamber can, for example, include a test particulate or gas release apparatus 109. The test particulate or gas generation chamber has an inlet connection 132 to a first pipe (e.g., 106-N) of an aspirating smoke detector pipe network to allow air 107 into the test particulate or gas generation chamber and an outlet connection 134 to a second pipe (e.g., 104) of an aspirating smoke detector pipe network for movement of air and test particulate or gas toward and into the smoke or gas detecting chamber via pipe 104.

In embodiments of the present disclosure, a test particulate or gas release apparatus is used to introduce test particulate or gas into the test particulate or gas generation chamber. The apparatus can be of any type suitable for providing a sufficient amount of test particulate or gas to provide a satisfactory test.

For example, in self-test devices, a self-test particulate (e.g., an aerosol) or gas release apparatus is positioned such that when the self-test is initiated, it produces a particulate similar to smoke from a fire or gas from a fire or emergency event that travels into the smoke or gas detecting chamber 111 to allow optical detector sensors 117 (utilizing the light source 113 and light beam 115 projected therefrom) to be tested to make sure they can detect smoke or gas. In some embodiments, the self-test particulate is created by the heating of a wax material (e.g., a solid, paraffin wax material) wherein the wax material is melted and produces the self-test particulate.

An example self-test particulate release apparatus could be constructed as follows. It can have an outer housing that forms a space inside the apparatus. Within the space, a heater can be positioned for melting the wax to release the self-test particulate from the wax material as discussed above or some other mechanism can be used to cause the self-test particulate (e.g., in embodiments where the particulate does not come from a wax material or a solid) to be airborne within the space.

The self-test particulate release apparatus can also include a fan, located within the space, in a conduit between the space and the chamber, or within the chamber, for directing the self-test particulate out of the space and into the chamber 109. However, it may be preferable to not run the fan during the test as the air movement should be the same or substantially similar to the air flow under normal operating conditions. Preferably, the air flow should be controlled by pump 119 as that will be the force moving the air during normal operating conditions. The release apparatus can be located within the chamber 109 or in air communication therewith to move the self-test particulate from the space within the release apparatus into the chamber 109.

During the self-test process, a pump 119 draws air 107 (with self-test particulate or gas) through the pipe network (e.g., pipes 104 and 106) and into the smoke or gas detecting chamber 111 thereby bringing the self-test particles into the smoke detecting chamber 111 to test the sensor 117.

The self-test process can be initiated at any time during operation of the aspirating smoke detector device. For example, the self-test process can be initiated periodically on a schedule (e.g., quarterly, monthly), or can be initiated by a technician that is either on site or remote.

Figure 2:
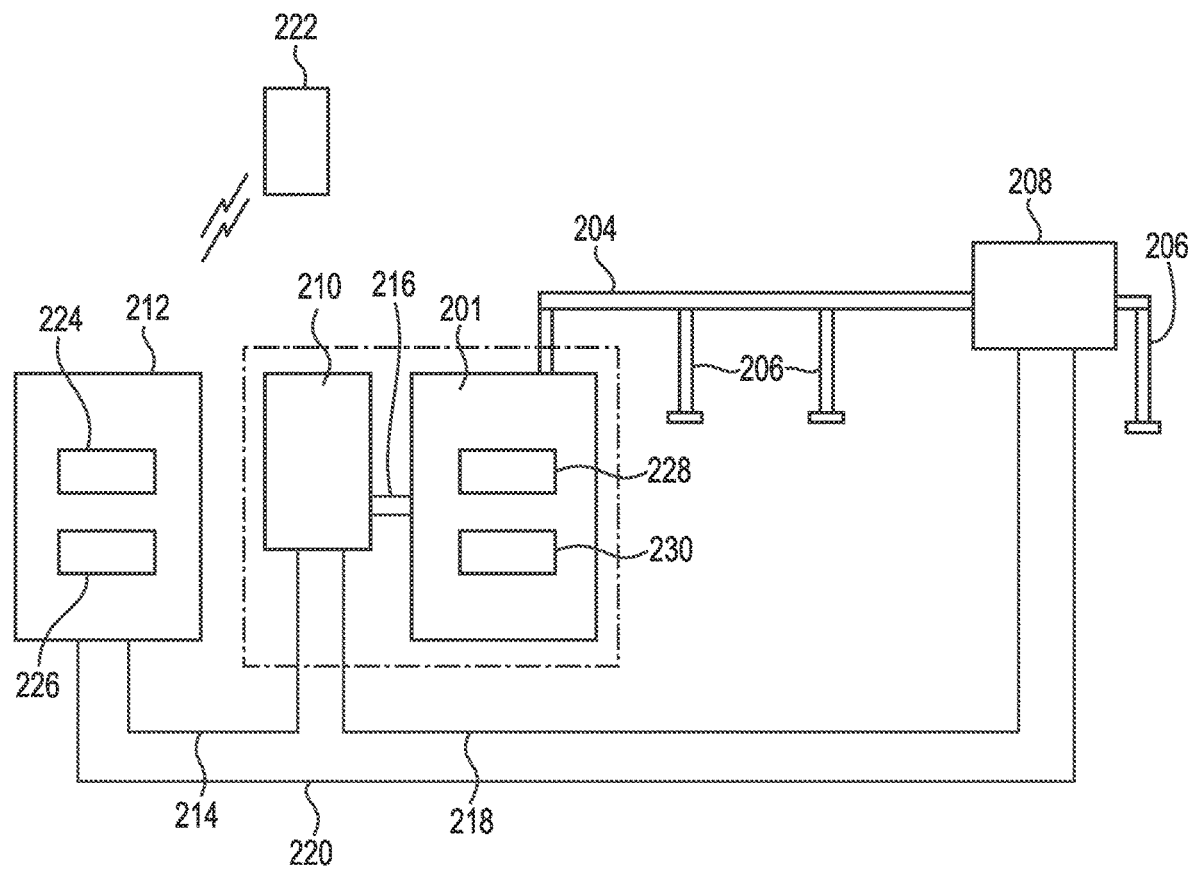
FIG. 2 is another example of an aspirating smoke detector system with test module in accordance with one or more embodiments of the present disclosure.

FIG. 2 is another example of an aspirating smoke detector system with test module in accordance with one or more embodiments of the present disclosure. For instance, the aspirating smoke detector device 201 can include a processor 228 and memory 230 and can execute instructions via the processor that are stored in the memory to determine whether a test process at the test smoke detector particulate generation module 208 should be initiated and to initiate a test process. Such determinations can be accomplished by a processor on the aspirating smoke detector device 201, another smoke detector device (wherein a master device determines initiation on one or more slave devices), an alarm system control panel 212, and/or a remote device 222 (e.g., mobile device used by a technician in the building or a monitoring system device located remotely from the building).

The aspirating smoke detector device 201 can include a processor and memory, wherein the processor executes instructions stored in the memory to accomplish certain smoke or gas detector device tasks, such as initiating a test process, actuating the pump to draw air through pipes 204 and 206, detecting whether there is smoke or a gas in the smoke or gas detecting chamber (within aspirating smoke detector device 208, determining if the particulate in the smoke or gas detecting chamber is test particulate or gas, and other normal aspirating smoke detector device functions. Initiation of a test process can be accomplished through executable instructions that are executed by the processor to provide scheduling or can user input via any of these devices through a user interface associated with one of the computing devices.

The aspirating smoke detector device 201 can be connected to a fire system control panel 212, other computing component 210 (e.g., a computing device, connected wirelessly or wired (e.g., via connections 214, 216, 218, and 220) and directly or indirectly, to the system control panel 212), or directly to a network access device, which is connected to one or more remote computing devices 222. These devices can also include processors and memory with instructions to determine whether to initiate a test and/or initiate the test.

The remote computing device 222 can be, for example, a mobile device that is used by a technician within the building and communicates, at least in part, through a gateway device of the local fire alarm system. The remote device 222 can also be a computing device at a remote monitoring location wherein one or more fire alarm systems are monitored for alarms and are tasked with coordinating a response to the alarm (e.g., coordinating first responders, contacting building owner/management, etc.).

The memory (e.g., 226/230) can be any type of storage medium that can be accessed by the processor (e.g., 224/228) to perform various examples of the present disclosure.

For example, the memory can be a non-transitory computer readable medium having computer readable instructions (e.g., executable instructions/computer program instructions) stored thereon that are executable by the processor for event device maintenance in accordance with the present disclosure. The computer readable instructions can be executable by the processor to provide the initiation and conducting of test.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory is illustrated as being located within the smoke detector device, embodiments of the present disclosure are not so limited. For example, memory can also be located internal to another computing resource (e.g., enabling computer readable instructions to be downloaded over the Internet or another wired or wireless connection).

As discussed above, a user (e.g., operator) can interact with the smoke detector device via user interface. For example, a user interface can provide (e.g., display and/or present) information to the user, and/or receive information from (e.g., input by) the user. For instance, in some embodiments, user interface can be a graphical user interface (GUI) that can provide and/or receive information to and/or from the user.

The display can be, for instance, a touch-screen (e.g., the GUI can include touch-screen capabilities). Alternatively, a display can include a television, computer monitor, mobile device screen, other type of display device, or any combination thereof, connected to the computing device and configured to receive a video signal output.

In some embodiments, the processor and memory can be in the form of a controller that controls a number of functions of the test process and/or the smoke detection process. For example, the controller can execute instructions with the processor that are stored in memory to receive data regarding the portion of the light beam received by a light sensor associated with the smoke detector chamber and analyzes the data to determine whether smoke particles, a gas, or test particles are present in the chamber.

Other functions can, for example, include: wherein the controller initiates melting of a solid to generate test particles or gas, wherein the controller initiates actuation of a fan apparatus to move the test particles or gas around within the chamber, and/or wherein the controller initiates an actuation of the pump (e.g., pump 119) after a predetermined time to move the test particles out of the chamber and into the pipe network.

As an additional example, user interface can include a keyboard and/or mouse the user can use to input information. Embodiments of the present disclosure, however, are not limited to a particular type(s) of user interface.

Figure 3:
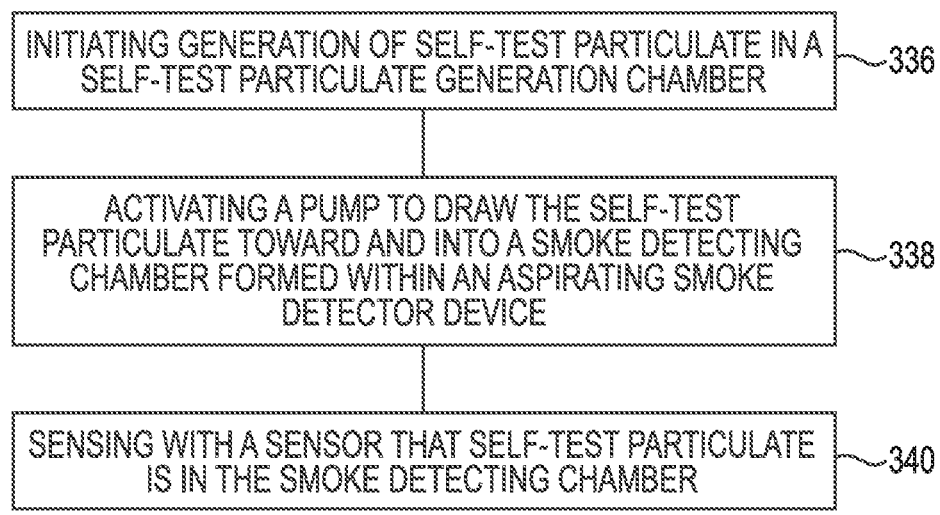
FIG. 3 is an aspirating smoke detector system test method in accordance with one or more embodiments of the present disclosure.

FIG. 3 is an aspirating smoke detector system test method in accordance with one or more embodiments of the present disclosure. The method includes initiating generation of test particulate or gas in a test particulate or gas generation chamber, at block 336. At block 338, the method activates a pump to draw the test particulate or gas toward and into a smoke or gas detecting chamber formed within an aspirating smoke detector device. And the method further includes sensing with a sensor that test particulate is in the smoke or gas detecting chamber, at block 340.

In various embodiments, a time value can be determined from initiating generation of the test particulate or gas to sensing that particulate is in the smoke detecting chamber. This information can be utilized to determine whether there is a blockage somewhere in the system. For example, the determined time value can be capered with a reference time value to determine if there is a blockage within the aspirating smoke detector system. The reference time can, for example, be stored in memory of the aspirating smoke detector device. And, as discussed herein, the reference time value can, for instance, be a calibration time value determined by testing the system and recording the calibration time value or can be a calculated time value based on at least one characteristic of the aspirating smoke detector system.

The embodiments of the present disclosure reduce the amount of false alarms, thereby, increasing the reliability of the devices and customer satisfaction. As discussed herein, the embodiments of the present disclosure can be beneficial in providing reduced blockage interference with smoke detection. Such embodiments can reduce technician time and the number of skilled technicians on site, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An aspirating smoke detector particulate or gas generation system, comprising:
   an aspirating smoke detector device housing having a smoke or gas detecting chamber formed therein;
   a sensor to determine whether smoke, gas, test particulate, or test generated gas is in the smoke or gas detecting chamber;

at least one sampling point positioned between the smoke or gas detecting chamber and a test aspirating smoke detector particulate or gas generation module;

the test aspirating smoke detector particulate or gas generation module, comprising:
- a housing having a test particulate or test generated gas generation chamber formed therein and wherein the test particulate or gas generation chamber has an inlet connection to a first pipe of an aspirating smoke detector pipe network and an outlet connection to a second pipe of an aspirating smoke detector pipe network; and
- a test particulate or test generated gas release apparatus that introduces a predetermined amount of test particulate or test generated gas into the test particulate or test generated gas generation chamber so that after it travels through a portion of the aspirating smoke detector a measured amount can be determined by a smoke or gas detecting sensor.

2. The smoke detector particulate or gas generation module of claim 1, wherein the test particulate is an aerosol.

3. The smoke detector particulate or gas generation module of claim 1, wherein the test particulate is generated by a self-test particulate release mechanism from a solid material thereby releasing test particulate within the solid material.

4. The smoke detector particulate or gas generation module of claim 1, wherein the test particulate is generated by a self-test particulate release mechanism from a wax material thereby releasing test particulate within the wax material.

5. The smoke detector particulate or gas generation module of claim 4, wherein a heater mechanism is positioned near the wax material and the wax material melts thereby generating test particulate from the wax material and the test particulate becomes airborne.

6. The smoke detector particulate or gas generation module of claim 4, wherein the wax material is a paraffin wax material.

7. The smoke detector particulate or gas generation module of claim 1, wherein when the measured amount is analyzed by a processor to determine that the measured amount is lower than an expected amount, thereby indicating a leak in the aspirating smoke detector.

8. The smoke detector particulate or gas generation module of claim 1, wherein when the measured amount is analyzed by a processor to determine that the measured amount is higher than an expected amount, thereby indicating a blockage in the aspirating smoke detector.

9. An aspirating smoke detector system, comprising:
- an aspirating smoke detector device housing having a smoke or gas detecting chamber formed therein;
- a sensor to determine whether smoke, gas, test particulate, or test generated gas is in the smoke or gas detecting chamber;
- at least one sampling point positioned between the smoke or gas detecting chamber and a test aspirating smoke detector particulate or gas generation module;
- the test aspirating smoke detector particulate or gas generation module, comprising:
  - a housing having a test particulate or test generated gas generation chamber formed therein and wherein the chamber has an inlet connection to a first pipe of an aspirating smoke detector pipe network and an outlet connection to a second pipe of an aspirating smoke detector pipe network; and
  - a test particulate or test generated gas release apparatus that introduces test particulate or test generated gas into the test particulate or test generated gas generation chamber.

10. The aspirating smoke detector system of claim 9, wherein the system further includes a controller that receives sensor data from the sensor and analyzes the data to determine whether smoke, gas, test particulate, or test generated gas are present in the smoke or gas detecting chamber.

11. The aspirating smoke detector system of claim 10, wherein the controller sends a command to a heater mechanism that initiates melting of a solid material thereby making test particles airborne.

12. The aspirating smoke detector system of claim 11, wherein the melting of the solid by a heater mechanism causes test particles to become airborne.

13. The aspirating smoke detector system of claim 12, wherein the controller initiates actuation of a fan apparatus to move the test particles or test generated gas around within the test particulate or test generated gas generation chamber.

14. The aspirating smoke detector system of claim 9, wherein a controller initiates an actuation of a pump to draw the test particulate or test generated gas toward the smoke or gas detecting chamber.

15. An aspirating smoke detector system test method, comprising:
- initiating generation of test particulate or test generated gas in a test particulate or test generated gas generation chamber;
- activating a pump to draw the test particulate or test generated gas through a pathway, having at least one sampling point located therein, toward and into a smoke or gas detecting chamber formed within an aspirating smoke detector device; and
- sensing with a sensor that test particulate or test generated gas is in the smoke or gas detecting chamber.

16. The aspirating smoke detector test method of claim 15, wherein the method further includes determining a time value from initiating generation of the test particulate or test generated gas to sensing that particulate or gas is in the smoke or gas detecting chamber.

17. The aspirating smoke detector test method of claim 16, wherein the method further includes comparing the determined time value with a reference time value to determine if there is a blockage within the aspirating smoke detector system.

18. The aspirating smoke detector test method of claim 17, wherein the reference time value is a time value stored in memory of the aspirating smoke detector device.

19. The aspirating smoke detector test method of claim 17, wherein the reference time value is a calculated time value based on at least one characteristic of the aspirating smoke detector system.

20. The aspirating smoke detector test method of claim 17, wherein the reference time value is a calibration time value determined by testing the system and recording the calibration time value.

* * * * *